(12) United States Patent
Willis (10) Patent No.: US 6,781,773 B2
(45) Date of Patent: Aug. 24, 2004

(54) BORESIGHT STABILITY OF AN OPTICAL SYSTEM

(75) Inventor: Chris L. Willis, Hollis, NH (US)

(73) Assignee: Bae Systems Information and Electronic Systems Integration Inc, Nashua, NH (US)

( * ) Notice: Subject to any disclaimer, the term of this patent is extended or adjusted under 35 U.S.C. 154(b) by 0 days.

(21) Appl. No.: 10/219,796

(22) Filed: Aug. 15, 2002

(65) Prior Publication Data

US 2003/0035209 A1 Feb. 20, 2003

Related U.S. Application Data

(60) Provisional application No. 60/312,485, filed on Aug. 15, 2001.

(51) Int. Cl.[7] ................................................ G02B 7/18
(52) U.S. Cl. ........................ 359/831; 359/837; 359/290; 385/88; 385/92
(58) Field of Search ................................ 359/349, 234, 359/816, 821, 822, 827, 206, 210, 290, 831, 837, 668, 669, 670; 385/92, 88

(56) References Cited

U.S. PATENT DOCUMENTS

| | | | |
|---|---|---|---|
| 5,017,949 A | * 5/1991 | Andoh et al. ................ 396/548 |
| 5,828,501 A | 10/1998 | Menard et al. ............. 359/819 |
| 5,932,119 A | 8/1999 | Kaplan et al. ......... 219/121.68 |
| 6,219,169 B1 | 4/2001 | Iizuka ........................ 359/234 |
| 6,393,037 B1 | 5/2002 | Basting et al. ................ 372/20 |

* cited by examiner

Primary Examiner—Drew A. Dunn
Assistant Examiner—Joshua L Pritchett
(74) Attorney, Agent, or Firm—Mainc & Asmus (57) ABSTRACT

An optical system with improved boresight stability having optical elements and a beam expander oriented on a chassis, wherein the beam expander is mounted for minimal movement. By minimizing movement of the beam expander, the angular error of a laser beam travelling through the optical system and subject to various angular tilt errors is reduced by an amount inversely proportional to the magnification ratio of the beam expander based on optical principles. In one embodiment the beam expander is mounted on a highly stiff location on the chassis and away from thermal stresses. Another embodiment is to mount the beam expander to a structural support of a higher assembly. The present invention isolates the beam expander from the instability of individual optical elements and from deformation of the optical bench that impairs the performance and diminishes benefits otherwise gained from the optical principles.

20 Claims, 4 Drawing Sheets

BORESIGHT STABILITY OF AN OPTICAL SYSTEM

CROSS REFERENCE TO RELATED APPLICATION

This application claims priority under 35 USC 119(e) to U.S. Provisional Patent Application No. 60/312,485 entitled "Improved Boresight Stability On An Optical Bench," filed on Aug. 15, 2001.

FIELD OF THE INVENTION

This invention relates to lasers and other optical instruments having stringent boresight stability requirements and used in harsh environments; and more particularly, to improving boresight stability on an optical bench that uses a beam expander near an inlet or exit aperture of the optical system.

BACKGROUND

Optical instrument technology has evolved rapidly over the past forty years. For instance, early lasers had few components and consisted of a laser rod, flashlamp and cavity reflecting mirrors. As the industry matured and lasers became more capable, laser systems became more complex, adding components to support Q-switching, amplification, novel out-coupling schemes, polarization control, lateral and angular beam alignment, power monitoring, beam divergence control, improved mechanical and thermal stability, optical parametric amplification, and frequency doubling. As complexity grew, so did the number and variety of applications, and so did the need for improved boresight stability—maintaining the optical beam angle with respect to some reference.

Light Detection and Ranging (LIDAR) units, lasers, fire control systems, missile defense systems, interferometers, and other optical instruments rely on boresight stability to function properly. Lasers and other optical instruments require thermal and mechanical stability to maintain beam quality, output power, beam divergence and mechanical boresight. Lasers and other optical instruments used in precision applications such as surveying and targeting, and used in demanding operating environments, such as military applications, have very high stability requirements.

One of the primary causes of degraded optical system boresight stability is mechanical motion. The mechanical motion arises from a number of possible sources, including thermal effects and mechanical loads within the optical system, change in index of refraction over temperature (henceforth referred to as dN/dT) effects in the components, and motion of the bench itself due to external mechanical loads. Possible sources of movement include: mounting stresses, thermally induced stresses, material dimension instabilities, vibration, acceleration loads, and pressure changes, such as result from altitude changes. For example, as internal temperatures change, each of the materials in an optical system expands or contracts at a rate different than other materials in the system, which introduces movement of the various components with respect to each other.

Differential thermal expansions and contractions cause distortions in the optical bench, chassis, and motion of other component parts in the optical system. These movements can therefore alter the alignments of optical system parts with respect to each other, and in turn, cause an adverse change in the boresight alignment of the optical system. This adverse change causes the output beam to deviate laterally and angularly from its intended path, thus degrading optical system performance. Additional external environmental factors, such as changes in altitude or aircraft g-forces, also exert mechanical forces on system components that also can adversely impact boresight alignment by causing differential movement of optical system parts. This aggregation of design and environmental factors, and their resulting adverse effects on boresight alignment, can yield an unreliable optical system, especially for precision laser applications such as surveying, targeting, missile defense, long-range free space optical communications, and the alignment of machinery and buildings.

Laser energy is Gaussian in nature and subject to divergence. In most applications, collimated light energy is used to direct a laser beam to some specific location. In may seem counter-intuitive, but to form a bright narrow spot at some distance generally requires a larger diameter beam of light. A beam expander is an afocal telescope often used as the final output element on various laser instruments like range finders, designators, laser radar equipment, free space laser communications equipment and countermeasures systems. The beam expander, whether reflective or refractive, takes collimated input beam and outputs a collimated output beam of a larger beam.

The beam expander telescope is typically mounted proximate an exit aperture and on the optical bench with other optical components. Thus, the beam expander device is subject to the same factors that detrimentally affect the optical bench and boresight alignment of other optical system components such as mechanical motion due to thermal and mechanical loads within the optical system, and external mechanical loads.

However, the state of the art implementations have yet to satisfy the commercial applications and there is considerable room for improvement. Thus, there is a need for improving the boresight stability of optical systems that use a beam expander telescope.

SUMMARY OF THE INVENTION

The invention is devised in the light of the problems of the prior art described herein, accordingly, it is a general object of the present invention to provide a novel and useful apparatus and technique that can solve the problems described herein. The improved optical boresight stability system, as disclosed herein, meets the need identified hereinabove for improving the boresight stability of an optical system that uses a beam expander apparatus near an exit aperture and that operates in a variety of environmental conditions.

A beam expander on the output end of a laser or laser instrument is commonly thought to reduce the output boresight angular error inherent in the laser and/or instrument itself by a factor equal to the magnification ratio (MR) of the beam expander. This is a significant benefit, if actually achieved, as the optical elements can be mounted at lower costs as the tilt error will be reduced by 1/MR.

In order to obtain this commonly calculated and commonly expected benefit, the beam expander must be mounted in such a way that it is isolated from the motions experienced by the other optics. Since it is the last component in a train of optics, it can be mounted somewhat separately from the other optics so that movement of the optical bench does not affect the beam expander. In one embodiment the beam expander is located near the reference feature to which boresight will be measured. The beam expander, more than any other component, should be mounted in such a separated and rugged way that it moves negligibly with respect to that reference. This can be accomplished, for example, by placing the beam expander at the mounting feet or an external wall of the structure. If the motion relative to this reference surface is negligible in magnitude with respect to the system requirements, then and only then will the overall angular tilt error of the laser beam be reduced by the magnification ratio of the beam expander. The common standard for measuring the angular error is the reflective reference. Another option is to employ a specific sighting reference, but this adds to the cost and complexity.

Except in systems with very large magnifications and very loose angular stability requirements, this theoretical benefit is not experienced because of the interaction between the motion of the beam expander itself and the motion of the optics and the optical bed upon which the optics are mounted. This movement of the beam expander device diminishes any benefit to boresight stability. The problem is more pronounced when the beam expander tilts in the same direction as the optics or opposite to the optics. In order to obtain the theoretical optical advantages of reducing angular error, the beam expander must not move with respect to the output reference surface of the instrument, and this aspect has eluded designers for many years.

Boresight stability is improved by reducing the motion of the beam expander telescope with respect to other optical system components. The motion of the beam expander telescope relative to other components is minimized by several techniques that may be combined for optimal performance. The mounting location of the beam expander telescope should be away from thermal sources and preferably near a laser mounting surface. The beam expander telescope should preferably be mounted off the optical bench to provide isolation. The beam expander can be mounted on a rigid section of the chassis and preferably in the approximate reference feature of the laser. The beam expander can also employ a more rigid section for the section coupling the beam expander.

One embodiment to achieve a stable optical system with a beam expander is to use a separate optical bench with various optics onboard the bench and the input laser source either on the bench or piped in from a laser pump. The separate bench is mounted to the chassis, and mount the beam expander to the main chassis very near to the reference surface and in a way that minimizes motion with respect to the beam expander.

The beam expander telescope can also be mounted on a highly stiff portion for the integral optical bench and chassis. In some embodiments the present invention is a subassembly to a larger system and the beam expander can be mounted to a structure of the higher assembly. The stiff portion can be the same bench if manufactured with materials of sufficient strength. The stiff portion can also be reinforced using thicker dimensions of material or using the various supporting members that are well known in the art. The result is a laser or other optical system that has improved boresight stability due to its reduced sensitivity to beam angle errors, with such errors being determinable by a factor equal to the telescope magnification ratio, as further described in the Detailed Description hereinafter.

An object of the invention is an optical subassembly with boresight stability, comprising a chassis having a planar section and with an optical bench mounted to the planar section, wherein the optical bench has a plurality of optical elements mounted thereon. The optical elements have a common optical axis, and a beam expander device is rigidly mounted and isolated from the optical bench, and wherein the beam expander is coincident with the optical axis.

In addition, an object includes where the subassembly is mounted within a higher assembly and the beam expander is mounted to a supporting structure of the higher assembly.

Another object is the optical subassembly, further comprising a first rigid support section and a second rigid support section coupled perpendicular to the planar section, and wherein the beam expander is mounted to the first rigid support section. In addition, there can be supporting structures mounted to the first rigid support section, wherein the supporting structures are selected from the group comprising reinforcing plates and angular braces. Another feature includes where the first rigid support section is thicker than the second support section.

An object of the invention is the optical mounting assembly with boresight stability, comprising an integral chassis and optical bench, having a substantially planar section coupled between a first substantially perpendicular section and a second substantially perpendicular section. There are a plurality of optical components mounted to the planar section, wherein the optical components have an optical axis, and a beam expander isolated from the integral chassis is positioned coincident with the optical axis.

In addition, wherein the beam expander device is selected from the group comprising a beam expander telescope, a reflective device having a curved optical mirror with a central opening and a second mirror located substantially along an axis of the central opening, and an off-axis beam expander.

Yet another object is the optical mounting assembly wherein the beam expander is placed away from thermal sources.

An additional object includes wherein a boresight error is $\theta_2$, an input beam tilt equals $\theta_1$, and a beam expander telescope magnification ratio is MR, and wherein the boresight error is reduced according to the formula:

$$\theta_2 = \theta_1 / MR.$$

An object of the invention is an optical mount with improved boresight stability, comprising a laser source emitting a laser beam with an optical housing having a substantially planar section coupled between a first rigid perpendicular section and a second perpendicular section. There are a plurality of optical components mounted to the planar section, wherein the optical components have an optical axis, and wherein the laser beam is transmitted substantially along the optical axis. There is also a beam expander attached to the first rigid perpendicular section, wherein the beam expander is interposed along the optical axis and outputs the laser beam with a larger diameter, and wherein the beam expander is isolated from movements of the housing.

A final object is the optical mount with boresight stability, further comprising a reference feature, wherein the beam expander is proximate the reference feature.

Still other objects and advantages of the present invention will become readily apparent to those skilled in this art from the following detailed description, wherein we have shown and described only a preferred embodiment of the invention, simply by way of illustration of the best mode contemplated by us on carrying out our invention. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

The apparatus and embodiments of the present invention disclosed herein enable implementations of improved boresight stability for an optical system. The preferred embodiments are merely illustrations of the techniques, and there are many other variations and applications all within the scope of the invention.

As described herein, improved boresight stability is obtained by isolating the beam expander and minimizing beam expander movement. This is accomplished in several ways, all designed to decouple the beam expander from the optical bench. One way to reduce beam expander movement is to carefully choose the mounting location of a beam expander telescope to be away from thermal heat sources. Another movement reduction scheme is to remove the mounting of the beam expander form the optical bench. The beam expander can be mounted to a rigid mounting region on the chassis and off the optical bench or mounted to an external structural member. For example, as a subassembly, the present invention can be installed into a higher assembly and the beam expander can be mounted to the structural member of the higher assembly. The result is an optical system that has a boresight error with reduced sensitivity to optical bench angular errors by a factor equal to the telescope magnification ratio, as described by the equations set forth hereinafter.

Figure 1:
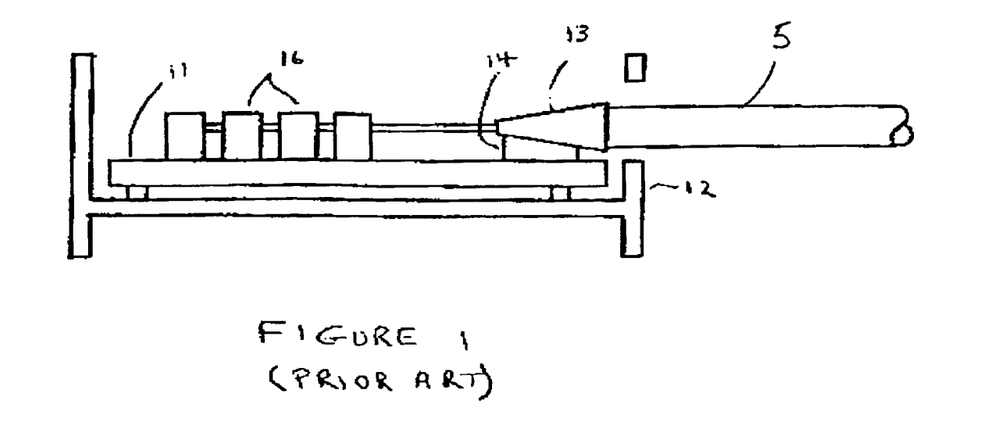
FIG. 1 shows a side view of a prior art optical bench that is pseudo semi-kinematically mounted to a chassis with a beam expander telescope attached by a mounting to the optical bench
Figure 2:
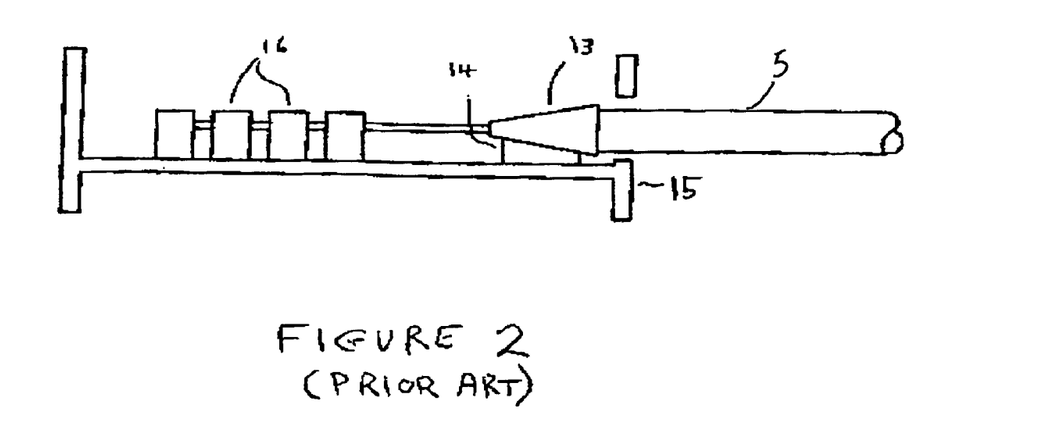
FIG. 2 shows a side view of a prior art integral optical bench and chassis with a beam expander telescope attached by a mounting to the integral optical bench and chassis

As described herein, a component in boresight alignment and stability in low divergence lasers and other optical instruments is a beam expander telescope that is typically mounted on an optical bench with all the other optical components. FIG. 1 and FIG. 2 illustrates the prior art methods of mounting a beam expander at the output end of an optical instrument.

FIG. 1 is a side view of a typical laser optical system, configured with a separate optical bench 11 that is pseudo semi-kinematically mounted to a chassis 12. A beam expander telescope 13 is attached to the optical bench by mounting 14 and interposed between the laser optics 16 and the exit aperture that emits the output laser beam 5. The optical bench 11 is fitted with all the optics 16, and then is pre-aligned in a fixture that emulates the chassis 12. The chassis 12 is fitted with items such as a wiring harness, diodes, heat exchanger and other components of the chassis subassembly. An advantage of making an optical bench 11 separately from a chassis 12 is that any motion of the chassis 12 is not readily telegraphed to the optical bench 11 and the components mounted thereon. Another advantage is that during construction of the optical system, the optical bench 11 and chassis 12 can be assembled simultaneously. However, movement of the optical bench 11 affects all the elements coupled thereto 13, 16.

FIG. 2 shows a side view of a typical laser optical system configured with an integral optical bench and chassis, wherein a beam expander telescope 13 is attached to the integral optical bench and chassis 15 by mounting 14. The integral optical bench and chassis 15 is fitted with all the optics 16 as required. This configuration, however, makes it very difficult to isolate and resolve individual thermal problems and movement in the system. When a laser optical system is assembled such that the beam expander telescope 13 is mounted to an integral optical bench and chassis 15, as shown in FIG. 2, the optical bench and beam expander telescope are easily influenced by the thermal and mechanical distortions of the entire chassis.

As can be seen, when the beam expander telescope 13 is mounted as shown in FIGS. 1 and 2, it is subject to the same mechanical alignment instabilities as the other optical system components due to the causes and factors described hereinabove. Therefore, when the beam expander telescope is mounted conventionally as shown in FIGS. 1 and 2, some telescope motion relative to the rest of the system, and resultant optical system boresight instability, will be experienced. Mounting the beam expander telescope 13 along with other optical components on the separate optical bench 11, as shown in FIG. 1; or on an integral chassis and optical bench 15, as shown in FIG. 2, permits undue beam expander 13 motion, adversely affecting the boresight accuracy. Thus, reducing the motion of beam expander telescope 13 with respect to the other components, bench, and chassis, improves the boresight stability of the overall laser optical system as detailed herein.

Some of the primary causes of poor boresight stability include the following: the mechanical motion of optical components due to thermal and mechanical loads within the laser system; dN/dT effects in the components; and motion of the bench itself due to external mechanical loads and environmental conditions. These effects occur whether the optical instrument is designed with an integral (FIG. 2) or separate (FIG. 1) optical bench, although some detrimental effects will be partially mitigated by the separated optical bench design.

For example, as internal temperatures change inside the optical system, each of the materials in the system expands or contracts at a rate different than other materials and components in the system. This differential thermal expansion results in distortions of the laser baseplate and/or in the motion of the component parts of the system that, in turn, cause the output beam to deviate laterally and angularly, leading to changes in boresight alignment. In addition, external environmental effects, such as changes in altitude or aircraft g-forces exert mechanical forces on the instrument, also impact boresight alignment. These changes in boresight alignment result in an unreliable laser or optical system for applications such as Lidar, fire control systems, missile defense systems, interferometers, surveying, targeting, alignment of machinery and buildings, and other optical instruments.

By mounting the beam expander telescope 13 on the separate optical bench 11, along with other optical components, as shown in FIG. 1, or on an integral chassis and optical bench 15, as shown in FIG. 2, there is movement of the beam expander 13. The movement of the beam expander 13 adversely affects the boresight error reduction benefit anticipated by the designers of the prior art, which represents the problem that is addressed by the present invention.

In an configurations according to FIG. 1 or FIG. 2, it is well known to those in the art that if you move a single optical element on the bench, such that the beam deviates in angle, then the output beam will deviate less than the deviation by a factor equal to the magnification ratio (MR) of the beam expander. This benefit of 1/MR is common knowledge to optical engineers and instrument designers, and is the theoretical basis that allows misalignment in the optics section to have a negligible impact on the output.

Figure 3:
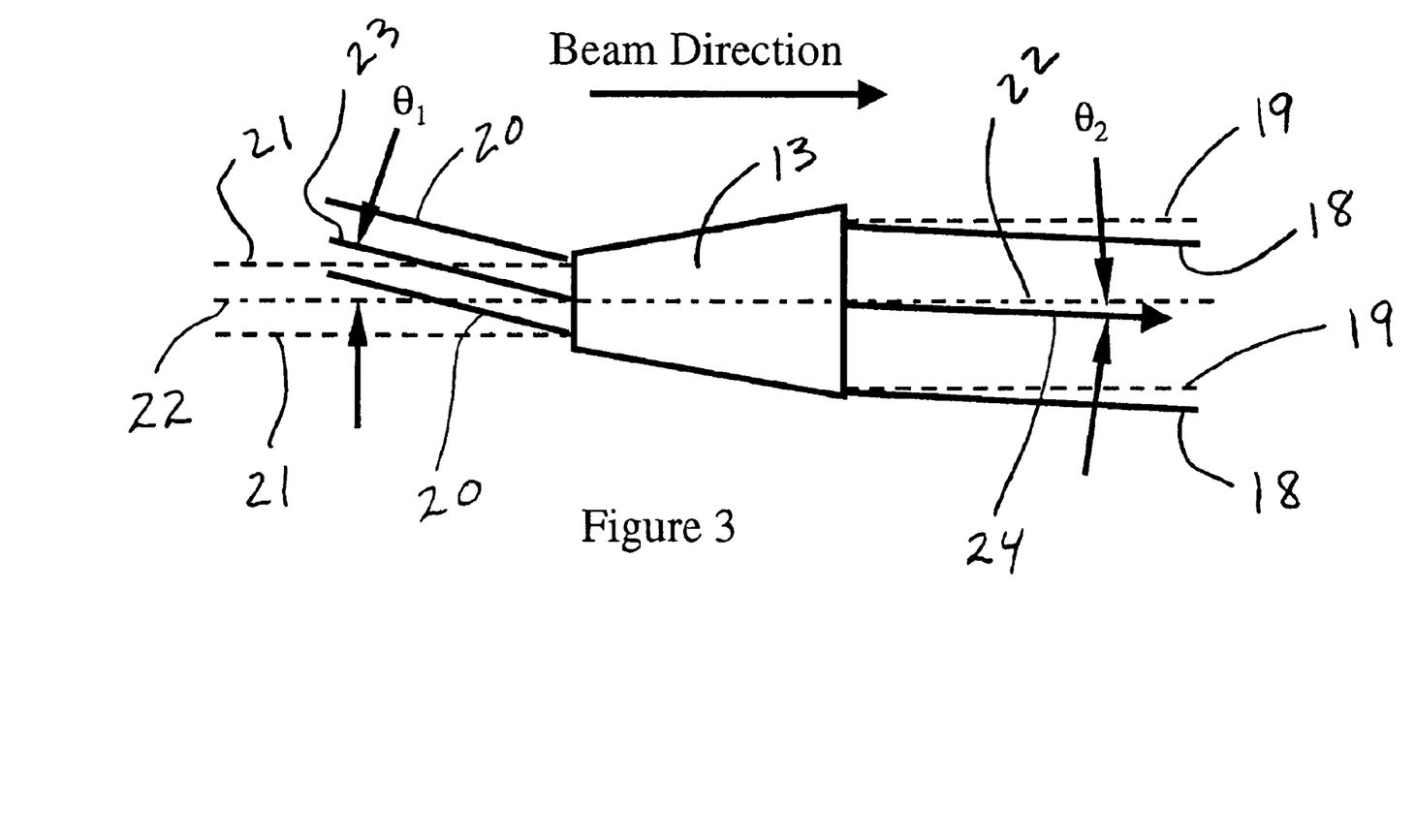
FIG. 3 shows a beam expander telescope with misalignment of the input beam into the telescope and misalignment of the output beam resulting therefrom

FIG. 3 illustrates the principle behind the theoretical improvement of the optical boresight stability system. In FIG. 3, a beam expander telescope 13 has a perfectly aligned input beam 21 with an axis 22. If optics and bench cause tilt error in the beam before it reaches the beam expander, then the tilted input beam 20 with the axis 23 will enter the beam expander instead of the intended perfect beam 21. Henceforth beam 20 will be referred to as the "tilted input beam" and beam 21 will be referred to as the "perfect input beam", and indicating that the laser beam is moving into the small input end of the beam expander. If the input beam is the perfect input beam 21, then the output angle of the beam expander 13 will be unchanged, as shown by output beam 19. If the input beam is beam 20, then the output beam will be tilted as shown by output beam 18. The angle of tilt error ($E_b$) in the input beam 20 is defined as $\theta_1$.

The theoretical output boresight error of such a system with no beam expander motion (tilt error $E_{tot}$ of the beam expander device 13 relative the optical system) is defined as $\theta_2$, shown as the angle difference between output beam 19 and the perturbed output beam 18. Perfect output beam 19 with center axis 22 is shown in relation to the actual output beam 18 with center axis 24. As illustrated, a beam expander telescope 13 having a magnification ratio MR (the diameter or effective diameter of beam 18 divided by the diameter or effective diameter of beam 20) has the effect on a perturbed input beam 20 of reducing the output angular error, $\theta_2$, of beam 18, by a factor equal to MR.

Any angular error in the beam that is introduced by the instability of individual optical elements mounted on the bench, or by instability of the bench structure or chassis, is theoretically reduced by a factor equal to the magnification ratio, as shown in FIG. 3.

$$\theta_2 = \theta_1/MR \quad \text{(Equation 1)}$$

For example, according to Equation 1, if beam expander 13 is an afocal 3× beam expander (MR=3), the boresight error, $\theta_2 = \theta_1/3$. This is the optimum reduction in boresight error offered by a beam expander telescope located at the exit aperture of an optical system.

There are other types of beam expanding devices for which Equation 1 is applicable, thereby theoretically reducing angular errors of the misaligned optical elements. Various bean expanders are within the scope of the invention and known in the art. For example, one common beam expander is a reflective device and has a curved optical mirror with a central opening or hole that allows input beam to pass there between. There is a second mirror located substantially along the axis of the central opening that re-directs the input laser beam to the curved optical elements thereby causing the input laser beam to expand to an output beam that is a multiple of the input laser beam times the magnification ratio. Another common beam expander, typically referred to as an off-axis beam expander, uses a first curved optical element that directs an input laser beam to a larger second optical element. The second optical element reflects the input laser beam into a larger output beam, in which the size of the output beam relates to the magnification ratio.

The accepted optical theory is limited to the case where the deviation to be reduced comes only from deviation of optics on the optical bench, such as the case shown in FIG. 3. In FIG. 3, the input error angle $\theta_1$ is reduced by the MR to become the smaller output error angle $\theta_2$, as depicted in Equation 1.

While the optical and system designers have depended upon such a reduction in the error angle, the theory does not translate into reality. The measurements taken from field testing often do not gain the beneficial results contemplated in the theoretical calculations. Heretofore, the reason for the poor performance has eluded the designers. Based on research and testing, the cause for the reality and theory conflict arises from the movement of the beam expander device itself.

There are three basic cases for movement that need to be accounted for in an optical system. A first type of motion is where the optical elements and the beam expander both move coherently, as a result of a free body motion of a rigid bench. In this case, there is no 1/MR benefit as the beam expander movement negates any benefit, and the output beam tilt angle would equal the input beam angle.

A second case is termed bench deformation and refers to the shifting (for instance; bending) of the planar surface upon which the optical elements are mounted. This shifting results in movement of the optical elements 16 mounted to the bench, including movement of the beam expander 13 if not isolated from the rest of the bench. Within this case there are several variations possible depending upon the specifics. The optics could move in the same direction as the beam expander but to a lesser extent so as to be non-coherent. The optics could also move in an opposing direction as compared to the beam expander. In any variation, if the beam expander is fixed to the deformed bench, there will be tilting in some arbitrary manner, and the end result is that there is some error component that affects the expected 1/MR benefit. In almost all cases where the motion of the input beam was opposite in angle to the motion of the beam expander, and it's error magnitude was larger than that of the beam expander by a factor approximately equal to MR, this effect is highly adverse.

The third situation is where the bench remains stable with respect to some system mounting reference, but the optical elements (or small optical subassemblies mounted on the bench) shift. Such an optical mount shifting is fairly common for various reasons including, the mounting materials having differing thermal expansion coefficients as compared to the optical bench, and residual stresses left in the mounts from fabrication. It is this type of error that the expected theoretical benefit from an output beam expander may be realized, because this case describes an error similar to that shown in FIG. 3, where the error is pure input beam tilt (remembering that input beam means input to the beam expander).

Figure 6:
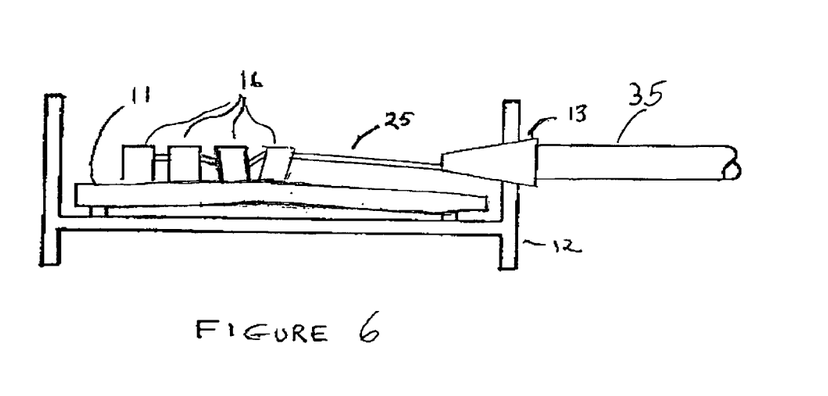
FIG. 6 shows a side view of an optical bench that is pseudo semi-kinematically mounted to a chassis, wherein the beam expander telescope is mounted separate from the optical bench onto the chassis
Figure 7:
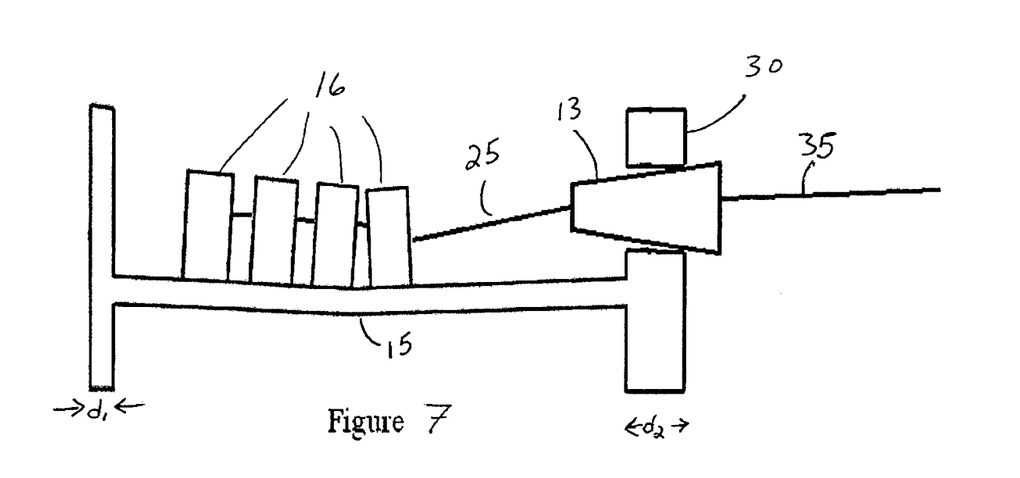
FIG. 7 shows a side view of an integral optical bench and chassis, wherein a beam expander telescope is mounted to a highly stiff portion of the integrated chassis and optical bench

The theoretical explanation for a diminishing of the angular error by 1/MR does not take into effect any movement of the beam expander itself. The diminishing practical results experienced in the real world results from deviation of the beam expander 13. To minimize or eliminate this boresight error, the beam expander telescope 13 is moved off the optical bench 11 and is mounted to a highly stiff portion of chassis 12, as shown in FIG. 6, or to a highly stiff portion of an integral optical bench and chassis 15 as shown in FIG. 7.

Furthermore, the beam expander 13 is preferably coupled to a laser mounting surface or reference feature (not shown, but such as reflective reference on the outside face of a system) so that the laser reference feature and beam expander are related with respect to movement. By isolating the beam expander from the misalignments of the other optical elements, the benefits from the optical theories are finally realized.

Figure 4:
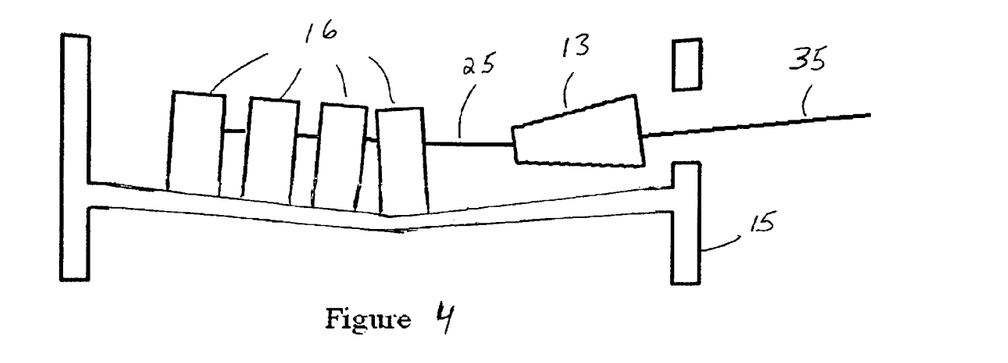
FIG. 4 shows a side view of a deformed optical bench that, wherein the beam expander telescope is coupled to the chassis and optical bench and subject to the same deformation as the optical elements

Referring to FIG. 4, the theoretical benefit for a reduction of the error angle as described herein is eliminated because of deviation of the beam expander. A common source of beam deviation is structural optical bench deformation as shown in FIG. 4. This type of deformation causes the internal beam 25 to deviate internally as the optics 16 on the bench 15 tilt with the bench. As noted in FIG. 4, each of the optical elements 16 can be impacted by the tilting of the bench 15 and effect the internal path of the beam 25.

If the beam expander 13 is also mounted on the optical bench 15, it tilts in similar fashion as the other optics mounted in close proximity to it. But, the direction and magnitude of tilt with respect to the theoretical beamline of the instrument or with respect to other optics not in close proximity are determined by the mode of deflection of the bench structure and its magnitude, and by the structural integrity of the beam expander construction. To determine the effects on the output beam 35, the structural and optical analytical models must take into account all the beam steering optics on the bench, including the beam expander 13 and the lenses 16. This is a complex and expensive task, but demonstrates that the majority of the output beam angle error for most perturbations of the model comes from the output beam expander 13, the very device that is supposed to be desensitizing the system to these types of errors.

Figure 5:
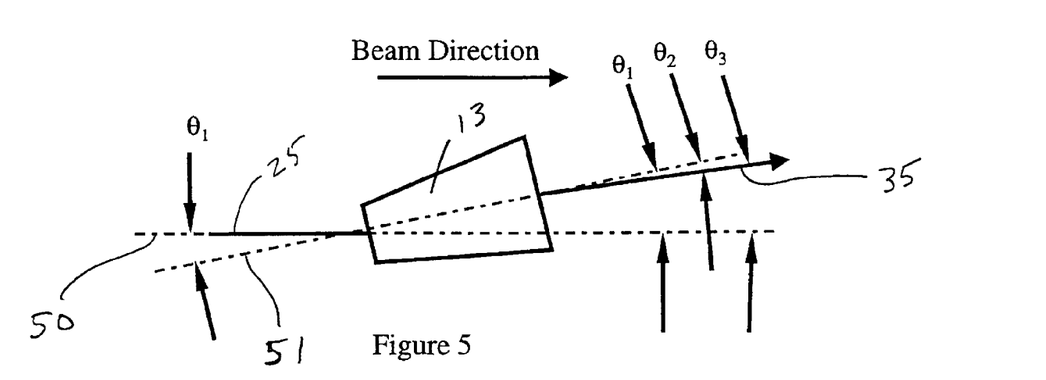
FIG. 5 illustrates that the angular error from the output of the shifted beam expander does not provide the expected magnification ratio benefit that reduces the angular error

To illustrate the effect of the movement of the beam expander in the case of FIG. 4, the effects of the deviation of the various elements are depicted in FIG. 5. FIG. 5 illustrates that if the input beam 25, the beam expander 13 and the output beam 35 are rotated an angle equal and opposite to the input beam error, $\theta_1$, the input beam 25 is parallel to the system output optical axis, illustrated as line 50 of FIG. 5.

Referring to FIG. 5, $\theta_1$ represents the input beam 25 angle error into the beam expander 13 with respect to a central beam expander axis 51. Line 50 is parallel to input beam 25, and indicates a horizontal reference plane and in this case the overall system output axis.

$\theta_2$ represents the deviation of the output beam 35 with respect to the optical axis of the beam expander 51, and again, represents the mistakenly expected output of the system. $\theta_3$ represents the actual angular error of the output beam 35 with respect to the system optical axis 50. Even where the beam expander motion is exactly opposite in direction to the input beam, the beam expander motion is overwhelmingly more important than the input beam motion because the beam is more sensitive (MR times more sensitive) to beam expander motion than to input beam motion.

Using Equation $\theta_2 = \theta_1/MR + tm$ Equation 1

$$\theta_3 = \theta_1 - \theta_2 \quad \text{(Equation 2)}$$

$\theta_3 = \theta_1/MR = \theta_1(1-1/MR)$, which for $MR>1$ yields $\theta_3 > \theta_2$ (Equation 3)

Thus, for angular stability of the output beam of a beam expanded system, the beam expander motion is much more important than the motion of other optics. Furthermore, far from aiding boresight stability (the tendency for an output beam to remain pointed in angle in the desired direction), in the typical deployment as depicted in FIGS. 1 and 2, the beam expander is a hindrance (precisely because of the method of deployment).

FIG. 6 shows a beam expander telescope 13 mounted according to one embodiment of an improved optical system boresight stability system where the optical bench 11 is separate from the chassis 12. In this embodiment, a beam expander telescope 13 is mounted to a stiff region of chassis 12 and is separate from the optical bench 11. In FIG. 6, beam expander telescope 13 is shown in its "on boresight" condition with respect to other optical components 16, which are mounted on optical bench 11. A laser beam 25 is shown passing through optical components 16 and beam expander telescope 13. Separating the beam expander 13 and isolating the expander 13 from the rest of the optical bench 11 keeps the bench 11 movements from interfering with the expander 13. Keeping the beam expander stable in angle with respect to the system in this case requires only an analysis of the chassis and the beam expander. If the beam expander 13 is made stable, then it becomes less important to keep all the other optics stable and prevent the bench from deforming.

In order to achieve the benefit of enhanced output beam angular stability for an integrated optical bench and chassis 15, the beam expander 13 can be mounted as shown in FIG. 7. The beam expander 13 of FIG. 7 is mounted to a stiffened bulkhead 30, which can be designed utilizing a separate and much more simple analysis than trying to predict the overall beam pointing 35 of the system. In one embodiment, the bulkhead 30 is a thicker dimension d2 than the corresponding dimension d1 of the remaining portion of the frame 15. This bulkhead 30 represents the pointing reference feature of an optical system, and if the reference feature is the bolting surface of the instrument, then that is the plane that must be stiffened and made as one with the output 35 of the beam expander 13. Alternate means for enforcing an existing bulkhead 30 include such structures as angle braces and reinforcing plates that strengthen the mounting of the beam expander 13 and minimize movement arising from the rest of the bench 15. Alternatively, in the situation where the present invention is a subassembly in a larger assembly, the beam expander can be mounted to a structural member (not shown) of the higher assembly.

The present invention reduces the motion of beam expander telescope 13 to insignificance, in comparison to the motion permitted when the telescope is mounted on optical bench 11 or 15, as shown in FIGS. 1 and 2.

In summary, reducing or substantially eliminating this optical misalignment and the resultant error from the various optical elements is achieved by mounting the beam expander telescope 13 in a position that is very stable with respect to its pointing direction. Mounting beam expander telescope 13 away from thermal sources and in a high stiffness region on chassis 12 or 15 that is directly connected to the laser system mounting bolts and reference alignment pins, if any, minimizes the motion of beam expander telescope 13, thereby substantially improving the boresight stability of the optical system.

Only if the beam expander 13 is isolated from movement will the benefit of boresight error reduction be achieved. Though it is not possible to mount the beam expander with zero motion over time, temperature and other environmental changes, the primary emphasis of the present invention is the stability of the beam expander. Furthermore, if it is a significantly large MR, then the motion of the rest of the optical system is less significant and may become insignificant to stability.

Thus, the improved optical system boresight stability system significantly reduces or substantially eliminates significant adverse boresight error and achieves substantially improvement over typical laser optical system configurations. The preferred embodiment results from carefully choosing the mounting location of the beam expander telescope to be away from thermal sources, off the optical bench/chassis on a highly stiff region of the chassis, or secured to a structural member of the higher assembly. In one embodiment, this requires moving the beam expander telescope 13 off the optical bench 11 and mounting it on a highly stiff portion of chassis 12, as shown in FIG. 6. Alternatively, the beam expander telescope 13 may be moved off the optical bench 11 and mounted on a highly stiff portion of integral optical bench and chassis 15, as shown in FIG. 7. Preferably, the beam expander telescope 13 should also be mounted near a laser mounting surface or feature (not shown) and exit aperture of the optical system. These locations minimize the motion of the beam expander telescope and thus reduce its sensitivity to optical bench angular errors. The result is an improvement in optical system boresight stability that is equal to a factor of the telescope magnification ratio.

Numerous characteristics and advantages have been set forth in the foregoing description, together with details of structures and functions of the present invention, and some of the novel features thereof are pointed out in appended claims. The disclosure, however, is illustrative only, and changes may be made in arrangement and details, within the principle of the invention, to the full extent indicated by the broad general meaning of the terms in which the appended claims are expressed. For example, the description of screws for the various securing members can be replaced by other members that are known in the art. The objects and advantages of the invention may be further realized and attained by means of the instrumentalities and combinations particularly pointed out in the appended claims. Accordingly, the drawing and description are to be regarded as illustrative in nature, and not as restrictive.

What is claimed is:

1. An optical subassembly with boresight stability, comprising:
   a chassis;
   an optical bench mounted to said chasis, wherein said optical bench has a substantially planar surface with optical elements mounted thereon, and wherein said optical elements have a common optical axis; and
   a beam expander device rigidly mounted and isolated from structural deformation of said optical bench, wherein said beam expander is coincident with said optical axis.

2. The optical subassembly with boresight stability according to claim 1, wherein said subassembly is mounted within a higher assembly and said beam expander is mounted to a supporting structure of said higher assembly.

3. The optical subassembly with boresight stability according to claim 1, further comprising a first rigid support section and a second rigid support section, with each rigid support section coupled perpendicular to a planar section of said chassis, where said optical bench is mounted on said planar section between the rigid support sections, and wherein said beam expander is mounted to said first rigid support section.

4. The optical subassembly with boresight stability according to claim 3, further comprising supporting structures mounted to said first rigid support section, wherein said supporting structures include at least one of reinforcing plates and angular braces.

5. The optical subassembly with boresight stability according to claim 3, wherein said first rigid support section is thicker than said second support section.

6. The optical subassembly with boresight stability according to claim 1, wherein said beam expander device is displaced from thermal sources.

7. The optical subassembly with boresight stability according to claim 1, further comprising a laser source coincident with said optical axis and for transmitting a laser beam to said optical elements and said beam expander.

8. An optical mounting assembly with boresight stability, comprising:
   an integral chassis and optical bench, having a substantially planar section coupled between a first substantially perpendicular section and a second substantially perpendicular section;
   a plurality of optical components mounted to said planar section, wherein said optical components have an optical axis; and
   a beam expander isolated from structural deformation of said integral chassis, wherein said beam expander is positioned coincident with said optical axis.

9. The optical mounting assembly according to claim 8, wherein said beam expander is mounted to said first substantially perpendicular section and further comprising supporting structures mounted to said first substantially perpendicular section, wherein said supporting structures include at least one of reinforcing plates and angular braces.

10. The optical mounting assembly according to claim 8, wherein said beam expander is mounted to said first substantially perpendicular section wherein said first substantially perpendicular section is thicker than said second substantially perpendicular section.

11. The optical mounting assembly according to claim 8, wherein said mounting assembly is subassembly mounted within a higher assembly and said beam expander is mounted to a supporting structure of said higher assembly.

12. The optical mounting assembly according to claim 8, wherein said beam expander one of an on-axis reflective beam expander, an on-axis refractive beam expander. and an off-axis reflective beam expander.

13. The optical mounting assembly according to claim 8, wherein said beam expander is placed away from thermal sources.

14. The optical mounting assembly according to claim 8, further comprising a laser source for transmitting a laser beam to said optical elements and said beam expander.

15. The optical mounting assembly according to claim 8, wherein a boresight error is $\theta_2$, an input beam tilt is $\theta_1$, and a magnification ratio associated with said beam expander is MR, and wherein said boresight error is reduced according to the formula:

$$\theta_2 = \theta_1/MR.$$

16. An optical mount with boresight stability, comprising:
   a laser source for emitting a laser beam;

an optical housing, having a substantially planar section coupled between a first rigid perpendicular section and a second perpendicular section;

a plurality of optical components mounted to said planar section, wherein said optical components have an optical axis, and wherein said laser beam is transmitted substantially along said optical axis; and a beam expander attached to said first rigid perpendicular section, wherein said beam expander is interposed along said optical axis and outputs said laser beam with a larger diameter, and wherein said beam expander is isolated from movements of said housing.

17. The optical mount with boresight stability according to claim 16, wherein said planar section is an optical bench, and wherein said optical components are mounted to said optical bench and said optical bench mounts to said housing.

18. The optical mount with boresight stability according to claim 16, wherein said first rigid perpendicular section is thicker than said second rigid perpendicular section.

19. The optical mount with boresight stability according to claim 16, further comprising supporting structures mounted to said first rigid perpendicular section, wherein said supporting structures include at least one of reinforcing plates and angular braces.

20. The optical mount with boresight stability according to claim 16, further comprising a reference feature, wherein said beam expander is proximate said reference feature.

* * * * *

UNITED STATES PATENT AND TRADEMARK OFFICE
CERTIFICATE OF CORRECTION

PATENT NO. : 6,781,773 B2
DATED : August 24, 2004
INVENTOR(S) : Chris L. Willis

It is certified that error appears in the above-identified patent and that said Letters Patent is hereby corrected as shown below:

The title page should be deleted to appear as per attached title page.

The sheets of drawings consisting of figures 1-7 should be deleted to appear as per attached figures.

Column 10,
Line 1, delete "Using Equation $\theta_2 = \theta_1/MR+tm$ Equation 1", insert -- Using Equation 1:$\theta_2 = \theta_1/MR$ --
Line 4, delete "$\theta_3 = \theta_1/MR = \theta_1(1-1/MR)$,", insert -- $\theta_3 = \theta_1 - \theta_1/MR = \theta_1(1-1/MR)$, --

Column 12,
Line 49, delete "expander one", insert -- expander is one --
Line 50, delete "expander.", insert -- expander, --

Signed and Sealed this

Twelfth Day of April, 2005

JON W. DUDAS
*Director of the United States Patent and Trademark Office*

(12) United States Patent
Willis (10) Patent No.: US 6,781,773 B2
(45) Date of Patent: Aug. 24, 2004

(54) BORESIGHT STABILITY OF AN OPTICAL SYSTEM (75) Inventor: Chris L. Willis, Hollis, NH (US)

(73) Assignee: Bae Systems Information and Electronic Systems Integration Inc, Nashua, NH (US)

(*) Notice: Subject to any disclaimer, the term of this patent is extended or adjusted under 35 U.S.C. 154(b) by 0 days.

(21) Appl. No.: 10/219,796

(22) Filed: Aug. 15, 2002

(65) Prior Publication Data
US 2003/0035209 A1 Feb. 20, 2003

Related U.S. Application Data
(60) Provisional application No. 60/312,485, filed on Aug. 15, 2001.

(51) Int. Cl.[7] ............................................. G02B 7/18
(52) U.S. Cl. ................... 359/831; 359/837; 359/290; 385/88; 385/92
(58) Field of Search ........................ 359/349, 234, 359/816, 821, 822, 827, 206, 210, 290, 831, 837, 668, 669, 670; 385/92, 88

(56) References Cited
U.S. PATENT DOCUMENTS

| 5,017,949 A | * | 5/1991 | Andoh et al. | 396/548 |
| 5,828,501 A | | 10/1998 | Menard et al. | 359/819 |
| 5,932,119 A | | 8/1999 | Kaplan et al. | 219/121.68 |
| 6,219,169 B1 | | 4/2001 | Iizuka | 359/234 |
| 6,393,037 B1 | | 5/2002 | Basting et al. | 372/20 |

* cited by examiner

Primary Examiner—Drew A. Dunn
Assistant Examiner—Joshua L Pritchett
(74) Attorney, Agent, or Firm—Maine & Asmus (57) ABSTRACT

An optical system with improved boresight stability having optical elements and a beam expander oriented on a chassis, wherein the beam expander is mounted for minimal movement. By minimizing movement of the beam expander, the angular error of a laser beam travelling through the optical system and subject to various angular tilt errors is reduced by an amount inversely proportional to the magnification ratio of the beam expander based on optical principles. In one embodiment the beam expander is mounted on a highly stiff location on the chassis and away from thermal stresses. Another embodiment is to mount the beam expander to a structural support of a higher assembly. The present invention isolates the beam expander from the instability of individual optical elements and from deformation of the optical bench that impairs the performance and diminishes benefits otherwise gained from the optical principles.

20 Claims, 4 Drawing Sheets